United States Patent Office 3,031,510
Patented Apr. 24, 1962

3,031,510
NONIONIC SURFACE ACTIVE AGENT
Samuel B. Crecelius, St. Paul, Minn., assignor to Economics Laboratory, Inc., St. Paul, Minn., a corporation of Delaware
No Drawing. Filed Oct. 1, 1957, Ser. No. 687,365
1 Claim. (Cl. 260—611)

This invention relates to nonionic surface active polymeric compounds, and has for its object the provision of an improved class of alkyl polyether alcohol compounds which are formed by the reaction of certain epoxy compounds with certain polyglycols. The nonionic compounds of the invention may be formed in a simple operation, at relatively low cost, and have exceptional properties making them particularly effective as detergents, and rinsing agents for dishwashing.

The nonionic surface active agents of the invention may be formed according to the invention by reacting a polyglycol with an epoxy compound, preferably at atmospheric pressure, and in the presence of a catalyst. The polyglycols used as a material for synthesizing the polymeric compounds of the invention probably do not have easily determinable precise structural formulae, but they are compounds of glycerol containing various polyethylene oxide and polypropylene oxide groups, which compounds also have identifiable physical properties. The polyglycols for use in reacting with an epoxy compound, such as butylene oxide, to form the nonionic products of the invention may be formed as the reaction products of glycerol with a mixture of ethylene oxide and propylene oxide in desired proportions and are infinitely soluble in water, alcohol and ether. A series of particular polyglycols that may be used effectively in forming the nonionic products of the invention are manufactured and sold by the Dow Chemical Company as Dow polyglycol E-15-100 to E-15-600. The polyglycols are trihydroxy polyoxyalkylene ethers of glycerol, more specifically trihydroxy mixed poly(oxyethylene oxy-1,2-propylene) ethers of glycerol, prepared by the condensation of glycerol with mixtures of ethylene oxide and propylene oxide in which the ethylene oxide represents from 20 to 80 mol percent of the mixture, the condensation being carried to a stage such that there are an average of at least 8 and up to 300 oxyalkylene groups per glycerol nucleus, the average molecular weight by the acetyl value varying from 500 to 6000. It is possible that since the ethylene oxide and propylene oxide are added to the glycerol at the same time the location of these oxides in the final molecule would be in random order. These polyglycols have viscosities at 77° F. varying from 200 to 1550 centistokes, and specific gravities varying from 1.064 to 1.02. For example, the product known as E-15-200 has a viscosity at 77° F. of 360 centistokes, a specific gravity of 1.053 and an average molecular weight of 2600. The aforementioned polyglycols do not contain a hydrophobic nucleus or group.

Any suitable epoxy compound may be used to react with a polyglycol having the aforementioned properties to add to it a hydrophobic group or groups. The epoxy compound is preferably added to comprise 25 to 45% by weight of the new compound. For example, I may use a commercial butylene oxide which is a mixture of the following butylene oxide isomers:

1,2-butylene oxide
   cis. 2,3-butylene oxide
   trans. 2,3-butylene oxide
   isobutylene oxide (the isobutylene oxide is approximately 10% of the total mixture)

One such mixture is a product of the Dow Chemical Company sold under the name "Butylene Oxide M" having the following properties: boiling point 50–67° C., molecular weight 72, specific gravity at 25° C. 0.824, refractive index at 25° C. 1.378, viscosity at 25° C. 0.40 centipoises, flash point 5° F., and is soluble in most organic solvents, but only slightly soluble in water.

Another suitable buytlene oxide is sold by Dow Chemical Company under the name "Butylene Oxide S" which is a mixture of straight chain butylene oxide isomers having the following properties: boiling point 60–67° C., molecular weight 72.1, specific gravity at 25° C. 0.826, refractive index at 25° C. 1.381, viscosity at 25° C. 0.40 centipoise, flash point 5° F., and is soluble in almost all organic solvents, but only slightly soluble in water.

Other suitable epoxy compounds are: epichlorohydrin, styrene oxide, epoxystearyl alcohol, and 1,2-diisobutylene oxide.

In another embodiment of the invention a polyglycol is formed by reacting a mixture of a suitable polyethylene oxide and a trihydroxy polyoxyalkylene ether as aforementioned with an epoxy compound and catalyst to produce an alkyl polyether alcohol of the invention. Suitable polyethylene oxides have molecular weights varying from 190 to 420. One suitable polyethylene oxide is Dow E-400 which has a molecular weight of about 400.

As stated above, the reaction of the polyglycol and epoxy compound may be carried out in the presence of a catalyst which may be either basic or acidic. As a suitable basic catalyst, sodium hydroxide or potassium hydroxide may be used, and as a suitable acid catalyst, phosphoric acid or boron trifluoride ether complex may be used. In either case the catalyst is neutralized and the resulting salt is filtered out of the product.

In carrying out an operation for the production of the improved nonionic alkyl polyether alcohol of the invention, a polyglycol of the aforementioned type is charged into a reactor equipped with an agitator and a reflux condenser with a side arm trap to remove any traces of moisture which might be present in the reaction mixture. The catalyst is then added, and the polyglycol is then heated to the desired temperature (130–180° C.) and the epoxy compound, for example butylene oxide, is added slowly, dropwise, at such a rate as to maintain a constant reflux and constant temperature. As the free butylene oxide is removed from the mixture by reaction, it is replaced at the same rate, thus maintaining a constant boiling mixture at the desired temperature. After all the butylene oxide has been added, the catalyst is neutralized (with sulfuric acid if a basic catalyst is used, and with sodium hydroxide if an acid catalyst is used) and the salt if filtered off. Steam or inert gas is then passed through the reaction mixture to remove any small amounts of decomposition products present, and any remaining unreacted butylene oxide, which cause undesirable odor. As a result of the reaction the nonionic alkyl polyether alcohol gains in weight by reason of the direct addition of butylene oxide, or other epoxy compound used.

The products of the invention have hydrophilic and hydrophobic nuclei and are very effective surfactants for various purposes. One of their important uses is as rinsing agents for dish washing. A desirable rinsing agent is one that causes the rinse water to spread out into a thin film and drain off the dish or glass surface without leaving droplets which form spots. The products of the invention are very effective rinse agents as they leave the dishes and glasses bright, clean, and free of spots. They are advantageously effective for use in the rinse cycle of automatic dish washing machines which employ injecting and metering devices for the rinse agent. One type of dish washing equipment in which the new surfactants may be used effectively is provided with an injector pump that can inject a precisely measured amount of the surfactant into the rinse water.

The products of the invention have several advantageous properties for rinsing agents including: superior foam depression, superior performance at lower concentrations, better stability in water solution at high temperatures, and superior performance when used in conjunction with diluents such as water and propylene glycol as rinsing agents.

The following examples illustrate operations carried out in the production of products of the invention:

EXAMPLE I

*Procedure.*—100 g. Dow polyglycol E–15–200 was charged into a three neck flask equipped with an agitator and reflux condenser. The charge was heated to 150° C., 5.0 g. KOH was ground to a powder and added to the reaction mixture and stirred until dissolved. This took approximately 10 minutes. 72 g. butylene oxide (Dow type M) was then added dropwise from a dropping funnel over a period of 14 hours. The reaction mixture was then neutralized with 25% sulfuric acid until a pH of 6.0 was reached. The salt produced was filtered out on a Buchner funnel to give a clear product.

The final product of the above reaction in concentration of 150 p.p.m. was added to the final rinse of a James automatic dish washer containing a controlled load of dishes soiled with a controlled amount of standard soil. The cycle of washing and rinsing was repeated five times. Very good rinsing results were obtained.

EXAMPLE II

*Procedure.*—2400 g. Dow polyglycol E–15–200 and 14 g. KOH were added to a flask equipped with an agitator and reflux condenser. The reaction mixture was then heated to 163° C. with agitation. By that time all the KOH had dissolved in the polyglycol. 1100 g. butylene oxide (Dow M type) was then added dropwise while maintaining a constant reflux at 150–160° C. All the butylene oxide was added over a period of nine hours. After all the butylene oxide was added, while still at 160° C., steam was passed through the mixture for thirty minutes to drive off volatile degradation products and deodorize. 13 g. sulfuric acid in 50 cc. of water were then added to the mixture while agitated to neutralize basic catalyst. The salt formed by neutralization was then removed by filtration on a Buchner. A clear, light colored product was obtained.

All the products of the above examples were soluble to at least 70% in water to give clear solutions.

Using the same method of rinsing evaluation described in Example I, excellent rinsing results were obtained at 175 p.p.m. concentration of the above product. Excellent rinsing results were also obtained in a field test under standard commercial conditions using a concentration of 50 p.p.m. of this product.

EXAMPLE III

*Procedure.*—400 g. Dow polyglycol E–15–200 was charged into a flask equipped with an agitator and a reflux condenser. The charge was heated to 160° C., 5.0 g. KOH was ground up and added to the charge and stirred for about 10 minutes until dissolved. 288 g. butylene oxide (Dow S grade) was then added dropwise while maintaining the temperature of the reaction mixture 160–180° C. with a constant reflux. All of the butylene oxide was added over a period of 4 hours. The temperature was then taken up to 200° C. to drive off the unreacted butylene oxide. The reaction mixture was then allowed to cool to 100° C. and the basic catalyst was neutralized with 25% $H_2SO_4$. The salt formed was then filtered off on a Buchner funnel, to give a clear product.

Using the same test as described in Example I, the above product at 175 p.p.m. concentration gave excellent results as a rinsing agent.

EXAMPLE IV

*Procedure.*—2160 g. Dow polyglycol E–15–200, 240 g. Dow polyglycol E–400, and 14 g. KOH were charged into a flask equipped with an agitator and a reflux condenser. The reaction mixture was heater with stirring to 165° C. By that time all of the KOH had dissolved. 1100 g. butylene oxide (Dow S type) was then added dropwise while maintaining a constant reflux and holding the temperature between 150–160° C. All the butylene oxide was added over a period of eight hours, and after it all had reacted, 13 grams of sulfuric acid in 50 ml. water was added slowly at 160° C. while agitating to neutralize the basic catalyst. Steam was then passed through the reaction at 160° C. for thrity minutes to remove decomposition products and deodorize. The salt formed by neutralization of the catalyst was then filtered off on a Buchner funnel to give a clear, light colored liquid.

The final product of the above reaction in concentration of 150 p.p.m. was added to the final rinse of a James automatic dish washer containing a controlled load of dishes soiled with a controlled amount of standard soil. The cycle of washing and rinsing was repeated five times. Very good rinsing results were obtained.

The product at 175 p.p.m. concentration gave excellent rinsing results. This product also gave excellent results in a field test under commercial conditions at 50 p.p.m. concentration. It has the advantage of being soluble to 65% in water and remained a clear solution.

The following table lists the proportions of reactants used in forming various compounds of the invention.

Products Synthesized From Epoxides and Polyglycols

| Polyglycol Used | | | | | Catalyst Used—Kind and percent total | Epoxide Used | | | | | |
|---|---|---|---|---|---|---|---|---|---|---|---|
| A, percent | B, percent | C, percent | D, percent | E, percent | | Percent Butylene Oxide(S) | Percent Butylene Oxide(M) | Percent Epichlorohyd. | Percent Styrene Oxide | Percent Epox. Stear. Alc. | Percent 1,2 diiso Butylene Oxide |
| 58.4 | ---- | ---- | ---- | ---- | 3.0% KOH | 41.6 | -------- | ------ | ------ | ------ | -------- |
| 61.8 | ---- | ---- | ---- | 6.8 | 0.4% KOH | -------- | 31.4 | ------ | ------ | ------ | -------- |
| 50.6 | ---- | ---- | ---- | ---- | 1.25% KOH | -------- | -------- | 49.4 | ------ | ------ | -------- |
| ---- | 58.4 | ---- | ---- | ---- | .7% KOH | -------- | 41.6 | ------ | ------ | ------ | -------- |
| ---- | 41.0 | ---- | ---- | ---- | 1.0% KOH | -------- | 59.0 | ------ | ------ | ------ | -------- |
| 58.4 | ---- | ---- | ---- | ---- | 0.29% KOH | -------- | 41.6 | ------ | ------ | ------ | -------- |
| 73.5 | ---- | ---- | ---- | ---- | 0.9% KOH | 26.5 | -------- | ------ | ------ | ------ | -------- |
| 65.0 | ---- | ---- | ---- | ---- | 0.8% KOH | 35.0 | -------- | ------ | ------ | ------ | -------- |
| 67.0 | ---- | ---- | ---- | ---- | 0.4% H$_3$PO$_4$ | -------- | 33.0 | ------ | ------ | ------ | -------- |
| 52.0 | ---- | ---- | 17.5 | ---- | 0.87% KOH | -------- | 30.0 | ------ | ------ | ------ | -------- |
| ---- | ---- | ---- | ---- | 73.6 | 0.9% KOH | -------- | 26.4 | ------ | ------ | ------ | -------- |
| 55.5 | ---- | ---- | 11.2 | ---- | 0.8% KOH | -------- | 33.3 | ------ | ------ | ------ | -------- |
| 60.0 | ---- | ---- | ---- | 6.7 | 0.7% KOH | 33.3 | -------- | ------ | ------ | ------ | -------- |
| ---- | 66.6 | ---- | ---- | ---- | 0.8% KOH | -------- | -------- | 33.4 | ------ | ------ | -------- |
| 91.5 | ---- | ---- | ---- | ---- | -------- | -------- | 9.5 | ------ | ------ | ------ | -------- |
| 89.6 | ---- | ---- | ---- | ---- | 0.7% H$_3$PO$_4$ | -------- | 10.4 | ------ | ------ | ------ | -------- |
| 61.8 | ---- | ---- | ---- | 6.8 | 2.0% H$_3$PO$_4$ | -------- | 31.4 | ------ | ------ | ------ | -------- |
| 66.6 | ---- | ---- | ---- | ---- | 0.4% KOH | -------- | -------- | ------ | 33.4 | ------ | -------- |
| 83.5 | ---- | ---- | ---- | ---- | 0.5% KOH | -------- | -------- | ------ | 16.5 | ------ | -------- |
| 91.0 | ---- | ---- | ---- | ---- | 0.5% KOH | -------- | -------- | ------ | 9.0 | ------ | -------- |
| 75.0 | ---- | ---- | ---- | 8.4 | 0.5% KOH | -------- | -------- | ------ | 16.6 | ------ | -------- |
| 83.0 | ---- | ---- | ---- | ---- | 0.3% KOH | -------- | -------- | ------ | ------ | 17.0 | -------- |
| 90.0 | ---- | ---- | ---- | ---- | 0.3% KOH | -------- | -------- | ------ | ------ | 10.0 | -------- |
| 95.0 | ---- | ---- | ---- | ---- | 0.3% KOH | -------- | -------- | ------ | ------ | 5.0 | -------- |
| 66.6 | ---- | ---- | ---- | ---- | 0.67% KOH | -------- | -------- | ------ | ------ | ------ | 33.4 |
| ---- | ---- | 66.6 | ---- | ---- | 0.6% KOH | -------- | 33.6 | ------ | ------ | ------ | -------- |

In the table A, B and C represent the nonionic compounds made from the polyglycols E–15–200, E–15–100 and E–15–600, and D and E represents the polyethylene oxides E–200 and E–400, of the Dow Chemical Company, respectively. The compounds of the table were tested for dish water rinsing agents and were found to vary from good to excellent.

In another aspect of the invention, I provide nonionic surface active polymers which are the reaction products of polyethylene oxide or polypropylene oxide, of any suitable or desirable molecular weight, with an epoxy compound. For example, I may react a polyethylene oxide having a molecular weight of from 190 to 420 with an epoxy compound such as butylene oxide.

I claim:

The nonionic surfactant compound having hydrophilic and hydrophobic groups produced by the process which comprises reacting trihydroxy mixed poly(oxyethyene oxy-1,2-propylene)ether of glycerol in which the ethylene oxide represents from 20 to 80 mol percent and from 8 to 300 oxyalkylene groups per glycerol nucleus with an epoxy compound of the group consisting of butylene oxide, epichlorohydrin, styrene oxide, epoxystearyl alcohol and 1,2-diisobutylene oxide and a catalyst, heating the mixture to a temperature of from 130° to 180° C., and after the reaction separating the resulting nonionic surfactant compound which contains from 25 to 45% by weight of said added epoxy compound.

References Cited in the file of this patent

UNITED STATES PATENTS

| | | |
|---|---|---|
| 2,641,614 | Britton et al. | June 9, 1953 |
| 2,674,619 | Lundsted | Apr. 6, 1954 |
| 2,733,272 | Horsley et al. | Jan. 31, 1956 |

FOREIGN PATENTS

| | | |
|---|---|---|
| 538,842 | Canada | Mar. 26, 1957 |

UNITED STATES PATENT OFFICE
CERTIFICATE OF CORRECTION

Patent No. 3,031,510                      April 24, 1962

Samuel B. Crecelius

It is hereby certified that error appears in the above numbered patent requiring correction and that the said Letters Patent should read as corrected below.

Column 4, line 47, for "heater" read -- heated --; line 57, for "thrity" read -- thirty --; columns 5 and 6, last line of the table, for "0.6%" read -- 0.67% --; column 5, line 47, for "oxyethyene" read -- oxyethylene --.

Signed and sealed this 7th day of August 1962.

(SEAL)
Attest:

ERNEST W. SWIDER
Attesting Officer

DAVID L. LADD
Commissioner of Patents